(12) United States Patent
De Biran et al.

(10) Patent No.: US 7,569,144 B2
(45) Date of Patent: Aug. 4, 2009

(54) DEVICE FOR THE SEPARATION OF A FLUID INTO AT LEAST TWO FRACTIONS, USING A PLURALITY OF MEMBRANE FILTERS, AND USE THEREOF

(75) Inventors: Olivier De Biran, Fleurieu sur Saone (FR); Alain Wallart, Saint-Martin la Plaine (FR); Bernard Castelas, Larchmont, NY (US); Michael Fishinger, Rahway, NJ (US)

(73) Assignee: Applexion, Saint Maurice de Beynost (FR)

( * ) Notice: Subject to any disclaimer, the term of this patent is extended or adjusted under 35 U.S.C. 154(b) by 345 days.

(21) Appl. No.: 10/557,472

(22) PCT Filed: May 19, 2004

(86) PCT No.: PCT/FR2004/001246

§ 371 (c)(1),
(2), (4) Date: Feb. 20, 2007

(87) PCT Pub. No.: WO2004/103533

PCT Pub. Date: Dec. 2, 2004

(65) Prior Publication Data

US 2007/0125722 A1 Jun. 7, 2007

(30) Foreign Application Priority Data

May 21, 2003 (FR) .................................. 03 06105

(51) Int. Cl.
*B01D 63/08* (2006.01)
*B01D 61/18* (2006.01)
*B01D 61/00* (2006.01)
*B01D 65/10* (2006.01)

(52) U.S. Cl. .............................. 210/321.75; 210/321.6; 210/321.84; 210/418; 210/433.1; 210/434; 210/499; 422/101

(58) Field of Classification Search ....................... None
See application file for complete search history.

(56) References Cited

U.S. PATENT DOCUMENTS 4,272,373 A 6/1981 Stenberg et al.

(Continued)

FOREIGN PATENT DOCUMENTS

JP 2000 301134 A 10/2000
WO WO 02/076529 A 10/2002

OTHER PUBLICATIONS

Patent Abstracts of Japan vol. 2000, No. 13, Feb. 5, 2001.

*Primary Examiner*—Krishnan S Menon
(74) *Attorney, Agent, or Firm*—Millen, White, Zelano, Branigan, P.C.

(57) ABSTRACT

The invention relates to a device for the separation of a fluid into at least two fractions, using a plurality of membrane filters, and to the use thereof. The inventive device comprises at least one sub-assembly (2a, 2b, 2c) of membrane support plates (8), with a filter membrane (10) being fixed to each of the opposing faces of the above-mentioned plates. According to the invention, the filter membrane is fixed to a part of the membrane support plate (8) that comprises means for guiding a first fraction of the fluid passing through the membranes (10) towards channels which are used to release said first fluid fraction and which are disposed in a lateral part of the plate (8). Moreover, the first fraction of the fluid is recovered inside a recovery space between the membrane (10) and one face of the membrane support plate (8). The membrane support plates (8) of each of the sub-assemblies (2a, 2b, 2c) are assembled to one another in an adjacent manner. Two adjacent plates (8) define a fluid circulation space (13) between the two membranes (10) which are fixed to opposing faces of two adjacent plates (8). The channels used to release the first fluid passing through the membranes (10) comprise, for each of the membrane support plates of the assembly (2a, 2b, 2c) and for each of the first fluid recovery spaces, one portion which is disposed inside a rigid transparent part (16). The aforementioned rigid transparent part is adjacent to a lateral longitudinal edge of the membrane support plate (8) which is associated with a sealing means (17). Furthermore, said sealing means can be actuated in order to stop the fluid from flowing into a corresponding recovery space.

19 Claims, 9 Drawing Sheets

U.S. PATENT DOCUMENTS 4,624,784 A * 11/1986 Lefebvre ............... 210/321.67
4,786,411 A    11/1988 Cronenberger et al.
5,575,910 A * 11/1996 Karbachsch et al. ... 210/321.75
7,315,780 B2 * 1/2008 Sugahara et al. ............ 701/200

* cited by examiner

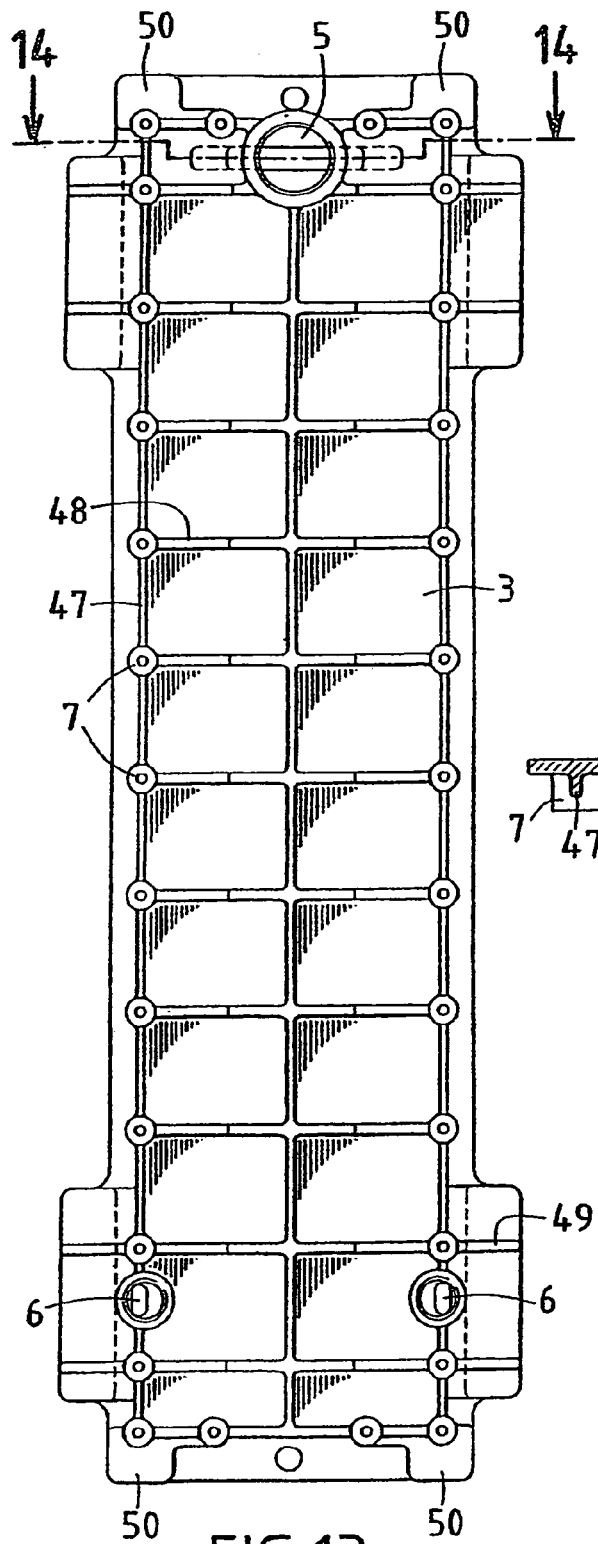
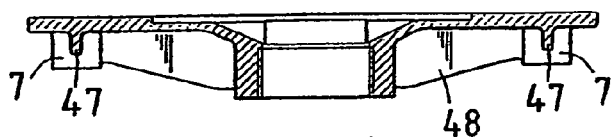
FIG.14
FIG.13

DEVICE FOR THE SEPARATION OF A FLUID INTO AT LEAST TWO FRACTIONS, USING A PLURALITY OF MEMBRANE FILTERS, AND USE THEREOF

BACKGROUND OF THE INVENTION

The invention relates to a device for the separation of a fluid into at least two fractions.

The invention is used in particular for the separation of paint and solvent, in containers of paint or of rinsing water recovered from motor vehicle bodies, in an installation for painting by cataphoresis.

Numerous fluids and in particular numerous liquids used under industrial conditions require separation operations, for example in order to be regenerated and recycled in an industrial process in which they are used.

In certain cases, one of the fractions separated from the fluid is eliminated, the other fraction being reused and, in other cases, the two fractions obtained by the separation are reused.

For example, in the case of installations for painting by electrophoresis or cataphoresis of motor vehicle bodies, this operation generally being aimed at producing an anti-corrosion base coat on the body, the separation operations can be carried out on a paint bath in which the bodies are immersed or on the water recovered after rinsing the body. In both cases, a first fraction is recovered, constituted by the paint solvent, i.e. in general a mixture of demineralized water and organic solvents which can also contain salts and other substances. This first fraction can be reused for rinsing the bodies. A second recovered fraction which is constituted by the paint can be recycled into the container containing the paint bath.

In other applications, in the field of the motor industry and more generally in the mechanical or surface treatment industries, the separation of substances contained in synthetic oils or water used for rinsing industrial articles can be carried out after degreasing, phosphatization and painting or also the recovery of paint which can be diluted in water.

In the field of the environmental conservation, it can also be necessary to carry out separation operations, for example for the treatment of cutting oils, biodegradable effluents or non-biodegradable effluents.

The separation devices used industrially generally comprise a membrane filter with which the fluid on which the separation operation is to be carried out is brought into contact, in such a manner that at least a part of the fluid passes through the membrane filter.

Filtration can be carried out by causing first fraction of the fluid to pass through the membrane, a second fraction contained in the fluid in homogeneous or non-homogeneous form being stopped by the membrane filter the pores of which allow the first fraction of the fluid to pass through.

A usual filtration process in which the fluid is passed through the membrane by gravity or by a pressure difference has the drawback of bringing about a rapid clogging of the membrane filter, due to the fact that the particles in the fraction of the fluid retained by the membrane are coated against the surface of the membrane and have a tendency to become fixed on the surface of the membrane or in the pores through the membrane.

It is very often preferable to resort to a process of separation with tangential circulation of the fluid in contact with the membrane, such as ultrafiltration utilizing a membrane the pores of which have a nanometric dimension. In order to carry out the separation, the fluid is circulated in contact with a surface of the membrane in a tangential direction. The fluid thus produces a continuous sweeping of the membrane, such that the particles which cannot pass through the ultrafiltration membrane of are entrained by the fluid and do not therefore have a tendency to accumulate on the surface of the ultrafiltration membrane.

On either side of the membrane a pressure difference is created, which can be of the order of a few bars which ensures the passage of a fraction of the fluid through the pores of the membrane, this fraction of the fluid being called the permeate.

The other fraction of the fluid, called the retentate, which cannot pass through the ultrafiltration membrane through the pores of this membrane circulates in contact with the surface of the ultrafiltration membrane in a tangential direction in order to be recovered in the vicinity of one end of the membrane.

In the case of the separation of solvent and paint, the solvent constitutes the permeate and the paint, the retentate.

Ultrafiltration separation devices are known which are constituted by modules in which the ultrafiltration membranes are coiled on themselves with insertion of a grid between the successive coils of the membrane. In such modules, called spiral modules, the circulating fluid is slowed down by the spacing grid and moreover, the particles which can be transported by the retentate are capable of clogging the grids.

Ultrafiltration fluid separation modules have been proposed in which the fluid and the retentate, circulating in a tangential manner relative to the ultrafiltration membrane, are not slowed down by any element inserted between the membranes.

Such ultrafiltration separation modules can in particular comprise plane membrane-support plates having two opposite faces on each of which an ultrafiltration membrane is fixed. Generally, the ultrafiltration membrane is mounted on part of the surface of the membrane-support plate comprising the fluid-guiding means, for example ribs delimiting between them grooves for the drainage of the permeate passing through the ultrafiltration membrane towards evacuation channels which can be provided in a lateral part of the membrane-support plate and the obtaining of turbulence in the outflow of the fluid. Each of the membranes delimits, with the part of the membrane-support plate on which it is mounted and fixed, a permeate recovery space in which the permeate is entrained towards the evacuation channels, inside the grooves.

The membrane-support plates constituting an ultrafiltration module are mounted one against the other with the insertion of a seal between the peripheral parts of two successive plates. The seal ensures that a fluid reception and circulating space is tightly sealed towards the outside of the module, the fluid reception space being delimited inside the module, by two ultrafiltration membranes facing one another and fixed on two opposite faces of two adjacent membrane-support plates.

The peripheral seals inserted between two successive membrane-support plates also ensure the maintenance of a gap between the membrane-support plates and between the opposite membranes which is necessary to ensure the passage of the fluid to be filtered in circulation between the two opposite membranes, inside the reception and circulation space. Means for supplying the fluid reception and circulation spaces are provided at one of the ends of the membrane-support plates and of means for recovering the retentate are provided at the opposite ends of the membrane-support plates. During the circulation of the fluid in the reception and circulation spaces between the membranes, the first fraction of the fluid constituting the permeate passes through the membranes, on both sides of reception and circulation space, in order to penetrate into the permeate recovery spaces delimited by each of the membranes. The fluid circulating in the reception and circulation spaces separated from the first fraction constituting the permeate, for example, a solvent in the case of a mixture of solvent and paint, constitutes the retentate which is constituted for example by the paint in the case envisaged above.

The permeate penetrating into the recovery spaces is drained by the grooves of the membrane-support plates in order to reach means of recovery connected with means of evacuation of the permeate which are connected to the ultrafiltration module.

At its ends, i.e. at the level of the first and last plate in the stack of the module, the latter is closed by rigid plates or retaining means which are mounted against the first and the last plates of the module with the insertion of a seal. The supply of fluid on which separation and recovery of the permeate and retentate is carried out can be achieved at the level of the retaining means.

Tie rods ensure the assembly of the membrane-support plates, being clamped one against the other by means of the seals, between the two retaining means.

Moreover, a separation device or module can comprise several successive sub-assemblies separated from each other by separating plates, the different successive modules being inserted between two retaining plates at the ends of the device.

Inside a sub-assembly of a module, between two separating plates or between a retaining plate and a separating plate, the fluid is distributed in the different successive reception and circulation spaces and the retentate is recovered at the outlet of the circulation spaces then collected at the outlet of the sub-assembly in order to be optionally introduced into a following sub-assembly. The retentate is distributed in the circulation spaces and constitutes the fluid on which the separation is carried out in the second sub-assembly. In other words, the different circulation spaces of a sub-assembly are mounted in parallel and the successive sub-assemblies of a module are mounted in series.

The successive membrane-support plates of the sub-assemblies and the successive sub-assemblies of a module are assembled in juxtaposed position with insertion of tightness seals, using tie rods the clamping of which is ensured at the level of the retaining plates. Each of the tie rods passes through a peripheral part of each of the membrane-support plates, separating plates and retaining plates.

The permeate is drained into each of the permeate-recovery spaces delimited between a membrane and a face of a membrane-support plate, towards recovery means connected to channels for evacuation of the permeate which can be connected to pumping means outside the filtration module.

The permeate-evacuation channels can be formed by openings passing through the membrane-support plates, the separating plates and at least one of the retaining plates which are placed in the alignment with one another, during the assembly of the module. This compact arrangement has advantages but, however, the circulation of the permeate which is carried out entirely inside the module cannot be made visible from the outside of the module, with the result that visual checking of the functions of the different elements constituting the module cannot be carried out. In particular, when a colouration or a turbidity of the permeate is detected at the module outlet due to the fact that at least one membrane has a leak, no simple means are available for determining the position of the membrane having a leak and for interrupting the circulation of fluid in the permeate recovery space delimited by the membrane having a leak. Moreover, the colouration or the turbidity of the permeate at the module outlet, due to the dilution of the permeate originating from the different elements of the module, is apparent only when the leak flow rate through the defective membrane has become very significant.

Damage to the membranes leading to the appearance of a leak can to a large extent be limited or avoided by taking measures to avoid elements capable of damaging the membranes being able to come into contact with them. For example, in order to avoid solid particles of prohibited dimensions capable of tearing the ultrafiltration membranes coming into contact with the ultrafiltration membranes, a pre-filtration of the fluid can be carried out before its introduction into the ultrafiltration module. Precautions can also be taken as regards the conditions of use of the ultrafiltration installation, for example as regards the stopping and starting operations of the installation.

However, there is a not-insignificant risk of damaging membranes during the operation of the separation device.

Certain types of ultrafiltration module make it possible to carry out control of the operation of the different elements of the module and in particular leak control of the membranes of the module. In these installations, each of the permeate-recovery spaces is linked to one or more collectors arranged outside the module, by means of transparent flexible pipes which allow the outflow of permeate originating from each of the recovery spaces to be made visible.

When a certain colouration or a certain opacity of the permeate appears inside a flexible pipe connecting a permeate recovery space to a collector, the two ends of the connecting pipe are disconnected, at the ultrafiltration module and at the collector and the module outlet and the collector inlet are plugged with stoppers.

It is also possible to connect the end of the connecting pipe outside the module to a leak-recovery collector.

In all cases, the plugging operation or operation for connecting to a leak collector require the removal of a connecting pipe, which results in an ejection of permeate in the locality where the installation is situated and possibly bringing the operators responsible for the plugging operation or operation for connecting to the leak connecter, into contact with the permeate, which can be unpleasant or even dangerous, depending on the nature of the fluid treated.

Moreover, there is a risk that the flexible connecting pipes which are outside the module will become caught and damaged by operators or handling equipment moving in the vicinity of the module.

SUMMARY OF THE INVENTION

The purpose of the invention is therefore to propose a device for the separation of a fluid into a first fraction and at least one second fraction by bringing the fluid into contact with at least one membrane filter, comprising at least one sub-assembly of membrane-support plates on each of the opposite faces of which is fixed a membrane filter, mounted on a part of the membrane-support plate comprising the means for guiding fluid for the drainage of the first fraction of the fluid passing through the membrane towards evacuation channels of the first fraction of the fluid into a part adjacent to a lateral edge of the membrane-support plate, inside a recovery space delimited between the membrane and the membrane-support plate and the obtaining of turbulence on the outflow of the fluid, the membrane-support plates of the sub-assembly being mounted against one another in a watertight manner, at their peripheral part, two adjacent plates delimiting a space for the reception and circulation of the fluid between two membranes fixed on opposing faces of the two adjacent plates, means for supplying circulation spaces with fluid, means for recovery of the first fraction of fluid in communication with assemblies of channels for evacuation of the first fraction of fluid and means for recovery of the fluid separated from the first fraction constituting at least one second fraction of the fluid, this device allowing easy supervision of the operation of the different membranes of the assembly without the use of flexible pipes capable of being damaged outside the separation device and of blocking the recovery space delimited by a membrane having a leak, without requiring an operation for the plugging or connecting of flexible pipes.

To this end, the assemblies of evacuation channels comprise, for each of the plates of the sub-assembly and for each of the recovery spaces, a portion provided inside a rigid part adjacent to the lateral edge of the membrane-support plate associated with a plugging means which can be actuated in order to stop the circulation in the corresponding recovery space.

The device according to the invention can have the following characteristics in an isolated manner or in combination:

- the rigid part adjacent to the lateral edge of the membrane-support plate is a piece made from transparent plastic material mounted projecting laterally relative to the lateral edge of the membrane-support plate so as to render visible a circulation of the first fraction of the fluid in the portion of the evacuation channels provided inside the piece projecting laterally relative to the lateral edge of the membrane-support plate;
- the rigid piece projecting radially relative to a lateral edge of the membrane-support plate is made of polyethylene terephthalate;
- the rigid piece projecting laterally relative to the lateral edge of the membrane-support plate is a cassette comprising a body in a single piece in which there are provided first conduits connecting a channel of a first assembly of evacuation channels of the first fraction of the fluid with first means of recovery of the first fraction of the fluid in a first recovery space between a first face of the membrane-support plate and a first membrane and second conduits connecting a channel of a second assembly of channels of evacuation of the first fluid with seconds means of recovery of the first fluid in a second recovery space of the first fluid between the second face of the membrane-support plate and a second membrane fixed on the second face of the membrane-support plate, the first connecting conduits and the second connecting conduits of the cassette being arranged in successive parts of the cassette in a longitudinal direction along the lateral edge of the membrane-support plate directed following the direction of circulation of the fluid in contact with the membranes carried by the membrane-support plate;
- the rigid pieces projecting laterally relative to a lateral edge of two adjacent membrane-support plates are fixed following parallel lateral edges of the adjacent membrane-support plates situated on both sides of the sub-assembly of the device in a transversal direction perpendicular to the longitudinal direction of circulation of the fluid in each of the circulation spaces and to the longitudinal direction of the sub-assembly according to which the evacuation of the first and second fractions of the fluid is carried out;
- the means for plugging the portion of the assembly of channels for evacuation of the first fluid provided inside the rigid piece projecting radially relative to a lateral edge of the membrane-support plate is a screw comprising a threaded part intended to be screwed into an opening in the rigid piece opening outside the rigid piece and connecting to the portion of the assembly of evacuation channels provided in the rigid piece and a plugging piston mobile between an opening position and a closing position of the portion of the assembly of channels for evacuation of the first fluid provided inside the rigid piece;
- the rigid part adjacent to the lateral edge of the membrane-support plate is an integral part of the membrane-support plate;
- the assembly of channels for evacuation of the first fraction of fluid, the means for supplying the circulation spaces of the sub-assembly with fluid and the means for recovery of the second fraction of fluid are constituted by openings passing through the juxtaposed membrane-support plates, during the assembly of the membrane-support plates in adjacent position;
- the means for recovery of the first fraction of the fluid in a recovery space delimited between a membrane and a face of the membrane-support plate comprise ribs which are substantially straight in a longitudinal direction and discontinuous, aligned in the vicinity of a lateral edge in a longitudinal direction of the membrane-support plate delimiting between them baffles for the passage of the first fluid and for guiding the first fluid towards the assembly of evacuation channels of the first fraction of the fluid, the straight and discontinuous parts projecting on the face of the membrane-support plate also ensuring maintenance of the membrane delimiting the recovery space with the face of the membrane-support plate;
- the spacing between the membrane-support plates and the thickness of the zones for the reception and circulation of fluid between two opposing membranes carried by two adjacent membrane-support plates is controlled by one of the following means:
- sealing device inserted between two successive membrane-support plates comprising, at its periphery intended to come into contact with the peripheral part of a membrane-support plate, at least one part projecting relative to a surface of the seal parallel to a membrane-support plate, so that the thickness of the seal is a maximum following the projecting part,
- plastic insert between the peripheral parts of two adjacent membrane-support plates,
- rib projecting over a peripheral part of a membrane-support plate;
- the peripheral sealing device intended to be inserted between two membrane-support plates which has the general shape of a rectangular frame comprises a central sealing part arranged substantially following a median line in a longitudinal direction of the seal in the shape of a rectangular frame, so as to limit or prevent the vibrations of the membranes carried by the membrane-support plates between which the sealing device is inserted;
- the device comprises at least one sub-assembly of membrane-support plates which is substantially rectangular shape arranged so that the longitudinal direction of the membrane-support plates is vertical, and the rigid parts adjacent to a longitudinal lateral edge of the membrane-support plate are situated in the upper part of the longitudinal lateral edges of the membrane-support plates;
- the device comprises at least two sub-assemblies of membrane-support plates separated from each other by separating plates and held assembled between two end retaining plates, the separating plates being passed through by at least one opening for the passage of the fluid or of the second fraction of the fluid at one longitudinal end, and by two sets of two lateral openings for the passage of the second fraction of the fluid into longitudinal end parts and into lateral zones of the separating plates, so as to be able to carry out an assembly in series of the sub-assemblies;

the retaining plates at each of the ends of the device constituted by at least two sub-assemblies comprise parts projecting laterally for protection of the rigid parts adjacent to the lateral edges of the membrane-support plates placed in a juxtaposed manner during the assembly of the membrane-support plates and of the sub-assemblies of the separation device;

the membranes are filter membranes comprising pores of nanometric or micrometric dimensions, the first fraction of the fluid being a permeate obtained by ultrafiltration or microfiltration and the second fraction of the fluid being a retentate; and the device according to the invention can be used for the separation of solvent and paint implemented in an industrial cataphoresis painting installation.

BRIEF DESCRIPTION OF THE DRAWINGS

In order to understand the invention, a description will now be given, by way of example, with reference to the attached figures, of an ultrafiltration module according to the invention which can be used in particular for the separation of solvent and paint used in a cataphoresis painting process.

FIG. 13 is a plan view of a retaining plate of the module according to the invention.

FIG. 14 is a transversal cross-section along 14-14 of the retaining plate represented in FIG. 13.

DETAILED DESCRIPTION OF THE INVENTION

Figure 1:
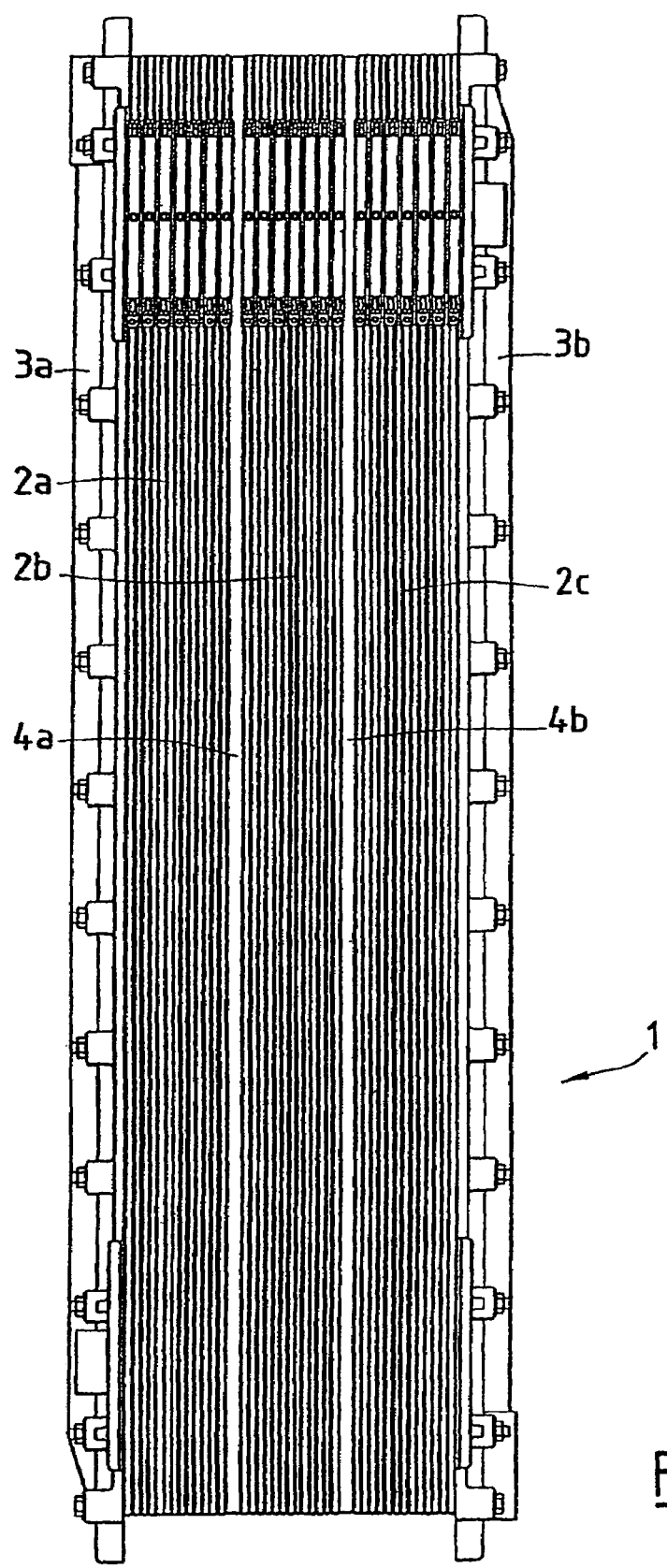
FIG. 1 is a side elevational view of an ultrafiltration module according to the invention.

FIG. 1 shows an ultrafiltration module according to the invention designated by the reference number 1.

Figure 2:
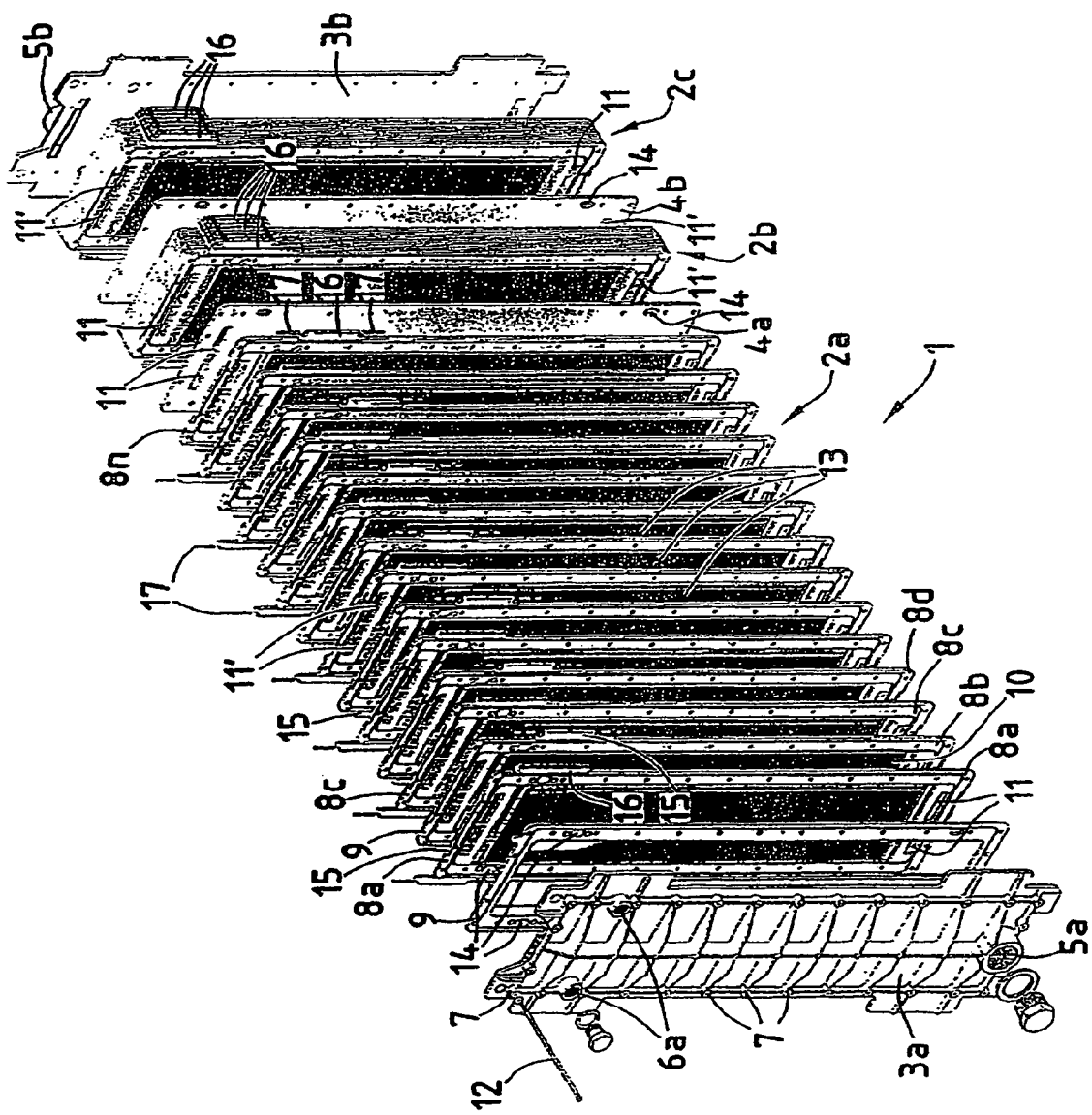
FIG. 2 is a partially exploded perspective view of the module represented in FIG. 1.

In FIG. 2, the module has been represented in a partially exploded view.

The module will be described, generally, with reference to FIGS. 1 and 2.

The module 1 comprises three successive sub-assemblies 2a, 2b, 2c in the axial direction of the module, i.e. the general direction of circulation of the permeate and of the retentate for their evacuation out of the module. At its axial ends, the module is closed by retaining plates 3a and 3b and separating plates 4a and 4b delimit the sub-assemblies 2a, 2b, 2c, inside the module.

The ultrafiltration sub-assembly 2a is delimited, on one side, by the retaining plate 3a and, on the other side, by the first separating plate 4a, the second sub-assembly 2b is delimited between the first and second separating plates 4a and 4b and the third sub-assembly 2c is delimited by the second separating plate 4b and the second retaining plate 3b.

The retaining plates 3a and 3b are produced in extremely rigid form and comprise fittings such as 5a and 6a for connecting the module to circuits for supplying fluid to be filtered and for recovery of fractions of the fluid after separation.

The retaining plates 3a and 3b also comprise reinforced eyelets 7 for the passage and clamping of tie rods 8 for assembling the sub-assemblies and the elements constituting each of the sub-assemblies.

The sub-assembly 2a has been represented in exploded view in FIG. 2 and will be described in more detail.

The sub-assemblies 2b and 2c of the module 1 are identical to the sub-assembly 2a and therefore will not be described in detail.

The sub-assembly 2a is mainly constituted by membrane-support plates 8 generally rectangular in shape each carrying, on two opposite faces, a first and a second ultrafiltration membrane 10. Between two successive plates, in the axial direction of the module, a sealing device 9 in the form of a rectangular frame is inserted, coming to rest on the rectangular peripheral part of the two membrane-support plates between which it is inserted. A sealing device 9 is also inserted between the first membrane-support plate 8a and the first retaining plate 3a. Similarly, a sealing device 9 is inserted between the last membrane-support plate 8n and the separating plate 4a.

The membrane-support plates 8 and the tightness seals 9 are described in more detail hereafter. It can however be pointed out here that the tightness seals 9 have the general function of ensuring tightness at the periphery of the membrane-support plates so as to close the circulation spaces of the fluid to be filtered and the retentate between two successive membranes, of ensuring tightness between the membranes and the membrane supports and of controlling very precisely the distance between two successive membrane-support plates defining the width of the fluid and retentate circulation space between two successive membranes.

The tightness between the superposed peripheral parts of the membrane-support plates could be carried out as variants, without use of seals, for example by providing peripheral parts stacked and clamped one against the other, optionally with a plastic insert acting as a spacer. The tightness is then ensured by plastic on plastic or plastic on metal contact.

The rectangular-shaped membrane-support plates are arranged perpendicular to the longitudinal direction of the module in which the general circulation of the first and second fluids (permeate and retentate) is carried out for their evacuation.

The membrane-support plates 8 are passed through at their longitudinal ends by holes 11 and 11' of elongated rectangular shape which occupy a substantial part of the width of the plates. The holes 11 and 11' passing through the membrane-support plates are arranged on both sides of the longitudinal ends of the membranes 10 carried by the plate 8.

When the module is assembled by juxtaposition of the membrane-support plates and of the seals (or plastic inserts) which are held by means of tie rods 12, the successive holes 11 and 11' in the membrane-support plates constitute longitudinal circulation channels of the fluid to be filtered and the retentate which are connected, throughout the length of the module, to the fluid and retentate reception and circulation spaces each delimited between two opposing membranes 10 placed on two successive membrane-support plates. The channels constituted by the holes 11 and 11' constitute respective means for supplying the sub-assembly with fluid to be filtered and for recovery of the retentate. When the fluid to be filtered is introduced into the module 1 by means of a conduit linked to the fitting 5a, the holes 11 situated in the lower part of the membrane-support plates 8 of the sub-assembly constitute a distribution channel of fluid to be filtered each connected with each successive fluid reception and circulation spaces 13 delimited between two successive membranes 10 of the sub-assembly. The holes 11' passing through the plates at their upper longitudinal ends then constitute retentate recovery channels connected to the outlet part of each of the reception and circulation spaces of fluid to be filtered and of retentate. In each of the reception and circulation spaces, the fluid to be filtered circulates in the longitudinal direction of the membrane-support plates and the membranes, i.e. in a direction perpendicular to the longitudinal direction of the module in which the general circulation of the recovered permeate and retentate is carried out, respectively at the outlet of the reception and circulation spaces 13 and in permeate-recovery spaces each delimited between a membrane 10 and a face of a membrane-support plate 8.

The membrane-support plates 8, the tightness seals 9 and the separating plates 4 are passed through by oblong-shaped holes 14 on each of their lateral sides, preferably in the upper part of the membrane-support plates, in the case of a module arranged such that the membrane-support plates have their longitudinal direction in a vertical way, this direction also being the circulation direction of the fluid to be filtered and of the retentate in the circulation spaces 13.

During the assembly of the sub-assemblies and the module, the holes 14 passing through the membrane-support plates, the seals 9 and the adapter plates come into alignment with each other in order to constitute a continuous permeate-evacuation channel, in longitudinal direction.

The permeate-evacuation channels are arranged in the upper part and on each of the lateral sides of the module. The membrane-support plates 8 each comprise, following one of their lateral edges, in the upper part of the lateral edge passed through by the holes 14, a connecting strip 15 made integral with the edge of the membrane-support plate. The connecting strips 15 are arranged, for two adjacent membrane-support plates, on opposite lateral sides of the membrane-support plates.

In the case of the sub-assembly 2a represented in FIG. 2, the odd plates 8a, 8c etc. comprise a connecting strip 15 on their right side (in the supply direction of the fluid to be filtered) and the even membrane-support plates 8b, 8d etc. comprise connecting strips 15 on their left side.

On each of the connecting strips 15 a cassette 16 is fixed in which connecting conduits are provided which have connecting fittings which engage in openings of the connecting strips 15 in order to ensure a link between the openings for the connecting strips 15 to pass through and the conduits connecting to the inside of the cassettes 16.

The cassettes and connecting strips which are mounted projecting relative to the lateral edge of the membrane-support plates 8 ensure, for each of the membrane-support plates 8, a connection between the two permeate-recovery spaces each delimited between a face of the membrane-support plate and a membrane 10 and the permeate-evacuation channel in a longitudinal direction constituted by the juxtaposed holes 14.

Each of the cassettes 16 comprises a first assembly of connecting conduits between a first permeate recovery space and the longitudinal permeate recovery channel and a second assembly of conduits connecting the second permeate recovery space situated on the opposing face of the membrane-support plate with the longitudinal evacuation channel.

Each of the assemblies of connecting conduits of a cassette 16 can be plugged by a plugging means 17 such as a screw, as described hereafter.

The connecting channels can thus be plugged selectively and independently of each other, in order to isolate either of the two recovery spaces of the membrane-support plate of the longitudinal evacuation channel.

Instead of being mounted on the lateral sides of the membrane-support plates, the cassettes could be made in a single piece with the membrane-support plate. Each of the cassettes can be arranged projecting relative to a lateral edge of a membrane-support plate or completely or partially integral with a lateral part of the membrane-support plate.

As explained hereafter, the membrane-support plates can comprise, on each of their faces, permeate-drainage grooves which make it possible to direct the permeate recovered in the recovery spaces towards permeate-recovery zones and evacuation channels which comprise the longitudinal channel constituted by the holes 14 and the pluggable connecting conduits inside the cassettes 16.

Means for guiding the recovered permeate could be constituted, as a variant, by a mesh optionally placed in a recess in the membrane-support plate.

It may be noted that the structure of the sub-assemblies and of the module according to the invention is particularly compact, the assembly of the distribution and recovery channels being produced inside the module without it is necessary to provide flexible pipes outside the module. The cassettes 16 fixed on the strips 15 following the upper parts of the longitudinal edges of the membrane-support plates 8 are made from a transparent rigid material, such that the circulation of permeate in the connecting channels of the cassettes 16 is perfectly visible on each of the sides of the module 1. The cassettes could also be made from an opaque material and comprise a transparent window.

In the case of an ultrafiltration module for cataphoresis paint or rinsing water used in a cataphoresis painting installation, the permeate is the paint solvent which is perfectly limpid in the case of satisfactory operating of the module.

In the case of a leak due to a tear in a membrane 10, paint passes through the membrane and the permeate is then cloudy or coloured (generally grey in the case of anticorrosion base coat body paint), with the result that the circulation of the permeate in the connecting conduits between the permeate recovery space, the membrane of which has a leak and the permeate-evacuation channel is then cloudy or coloured. The operator responsible for supervision of the installation immediately detects the presence of a leak in one of the recovery spaces and the location of the membrane with a leak. This identification is particularly easy when the cassettes 16 are arranged in the upper part of the module, in a zone situated substantially at the observer's eye level. There is no risk of the cassettes 16 made of rigid material which project laterally only slightly relative to the membrane-support plate being damaged during the passage of personnel or transport equipment along the module, unlike the devices according to the prior art comprising external flexible pipes which can be caught by personnel or equipment moving in the vicinity of the module.

Moreover, the arrangement of the cassettes alternatively on a lateral edge and on an opposing lateral edge, on the successive membrane-support plates makes it possible to provide cassettes having a thickness substantially equal to the thickness of the plates and ensuring the supervision of the two permeate-recovery spaces of the plate, i.e. of the two membranes carried by the membrane-support plate, independently of each other.

Figure 3:
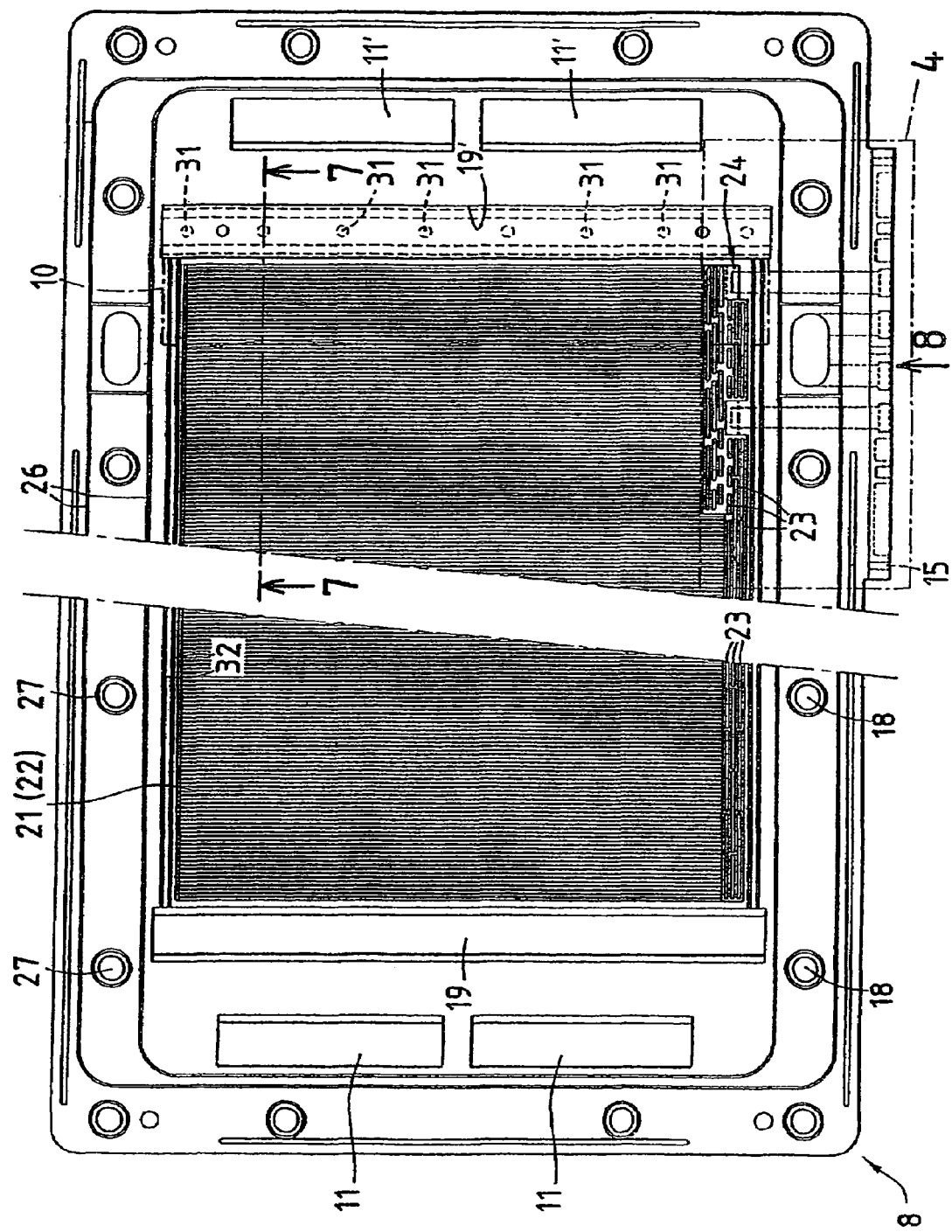
FIG. 3 is a plan view of a membrane-support plate of the module according to the invention.

FIG. 3 shows a plan view of a membrane-support plate 8, the central part of the plate between its longitudinal ends having been omitted, this central part having no characteristics requiring a detailed description.

The membrane-support plate 8 has an elongated rectangular general shape, the length of the plate being able to be for example greater than one metre and the width of the order of 30 cm. The membrane-support plates 8 can be produced by injection moulding of a plastic such as talc-filled polypropylene providing satisfactory strength and contact properties.

In FIG. 3, the membrane-support plate 8 is shown with its lower end (with reference to FIG. 2) on the left of the figure and its upper end, in the right part of the figure.

FIG. 3 shows one of the faces of the membrane-support plate or face A, the second face, or face B, being analogous, given certain differences which are explained below, in particular with reference to FIG. 5 which represents a detail of the face B of the non-visible plate in FIG. 3, the details of FIGS. 4 and 5 being arranged respectively on the faces A and B on either side of the membrane-support plate 8.

Generally, the membrane-support plate 8 comprises a peripheral part in the shape of a rectangular frame passed through by openings 18 for the passage of the tie rods 8 for assembly of the sub-assemblies and the module. The central part of the membrane-support plate of rectangular shape inside the peripheral frame comprises, at its ends, two smooth plane parts passed through on the lower side of the plate by the holes 11 for distribution of the fluid to be filtered and, on the side of the upper part of the membrane-support plate, by the holes 11' for recovery of retentate.

Figure 7:
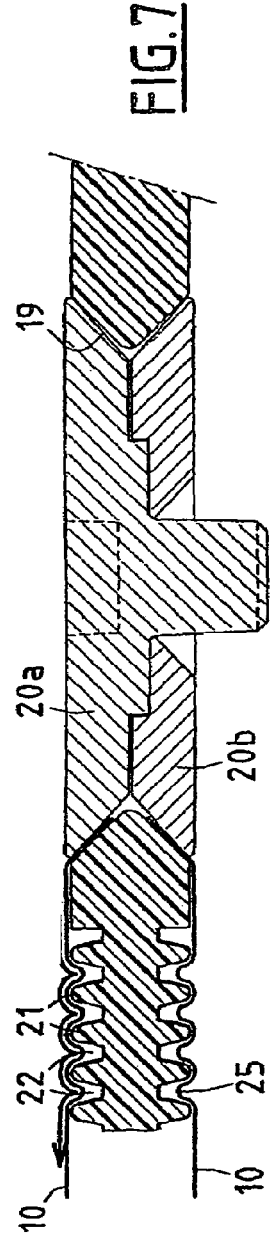
FIG. 7 is a cross-section along 7-7 in FIG. 3.
Figure 8:
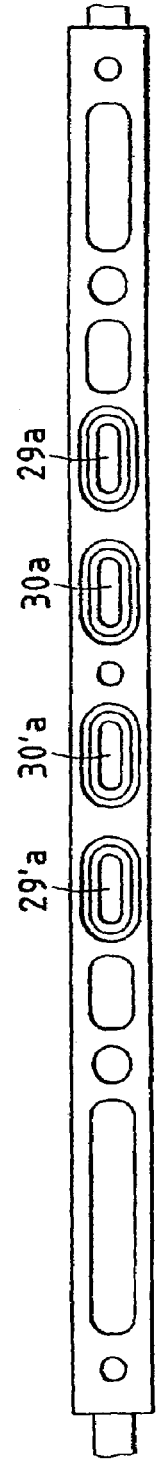
FIG. 8 is a side view of a lateral edge of a membrane-support plate in a zone for mounting a cassette for visualization of the permeate.

The plane parts at the longitudinal ends of the central part of the membrane-support plate 8 are also passed through by rectangular holes 19 and 19' occupying the greater part of the width of the central part of the membrane-support plate the longitudinal sides of which comprise chamfers inclined in the opposite direction from the face A and from the face B of the membrane-support plate, as is visible in particular in FIG. 7.

Male and female strips, 20a and 20b respectively, are introduced into the holes 19 and 19' and assembled and welded together, as will be explained below, so as to ensure the holding of the longitudinal ends of the two membranes 10 carried by the membrane-support plate 8. The fixing of the membranes by means of strips could be replaced, as a variant, by gluing the membranes on end parts of the membrane-support plates.

Between its ends on which the membranes 10 are fixed, the plate 8 can comprise, on its two faces, straight ribs 21 delimiting between them grooves 22 in transversal direction. Along a longitudinal side, on its face A and on its face B, the membrane-support plate 8 comprises a zone for guiding the permeate in which the plate comprises discontinuous straight projecting ribs 23 (visible in particular in FIGS. 6A and 6B) which constitute baffles to ensure optimum guiding of the permeate towards a permeate-recovery zone 24 (on face A) or 24' (on face B) represented in FIGS. 4 and 5 respectively.

The assembly of the drainage elements of the membrane-support plate 8 on its faces A and B is constituted by the transversal straight grooves 22 and the baffles 23, so that the permeate recovered in a recovery space 25 delimited by a membrane 10 and a face of the membrane-support plate 8 is directed towards the zone 24 (or 24') in which the membrane-support plate comprises an opening connecting the recovery space 25 to an inlet part of the permeate-evacuation channels, as explained hereafter.

As indicated above, the guiding means of the permeate which ensure the drainage of the permeate and the formation of turbulence in the outflow of the permeate can be produced, as a variant, by a mesh housed in the membrane-support plate or between two successive membrane-support plates.

The membranes 10 which are fixed against the two faces of the membrane-support plate 8, in the part comprising the guiding means of the permeate are constituted by a woven or non-woven fabric support with a very small thickness (a few tens of micrometres) coated with a substance such as collodion making it possible to produce pores with nanometric dimensions through the membrane.

Figure 6:
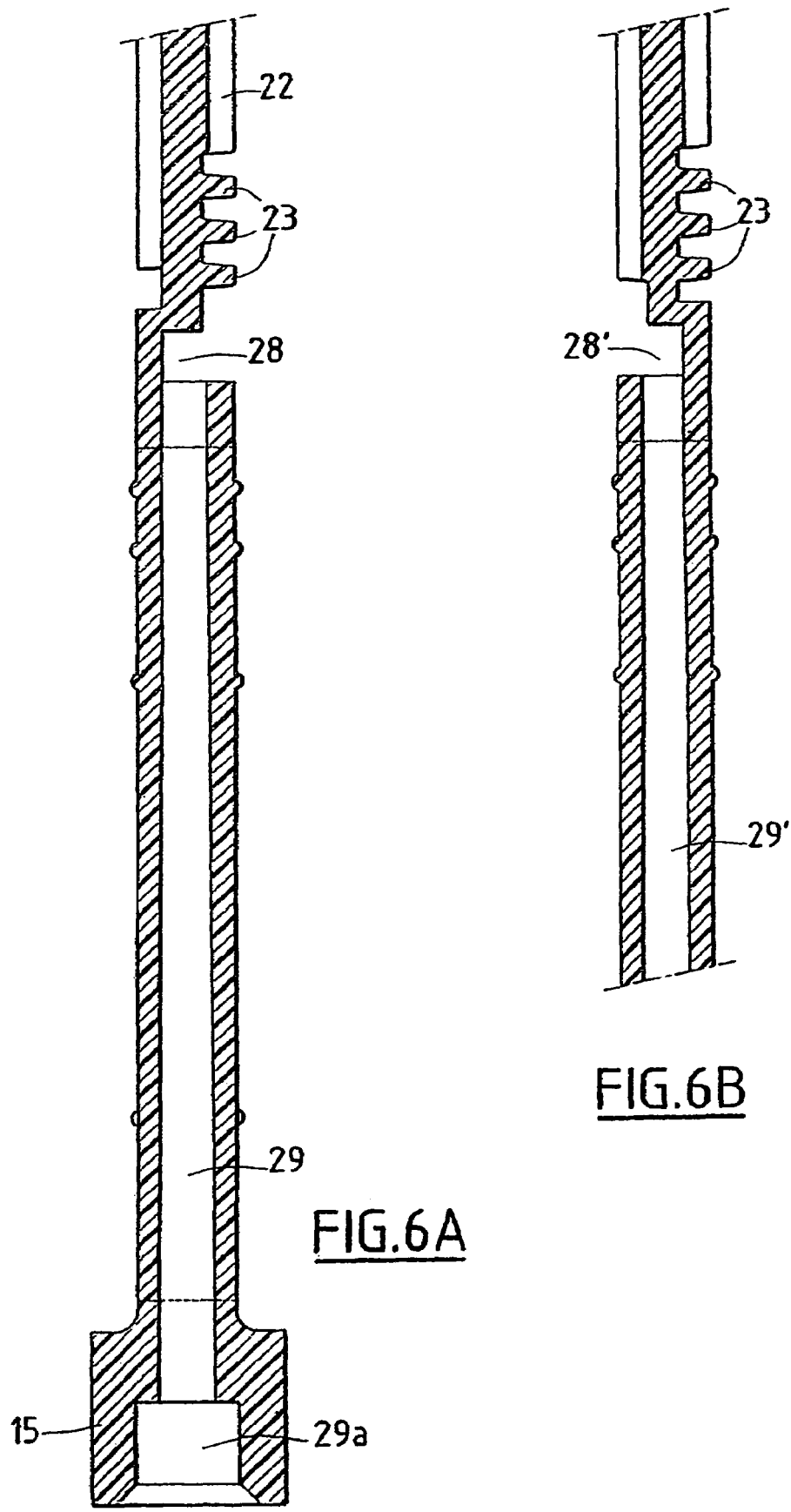
FIG. 6A is a cross-section along A-A in FIG. 3.
FIG. 6B is a cross-section along B-B in FIG. 3.

As can be seen in FIG. 3 as well as in FIGS. 6A, 6B and 7, the membrane-support plate can comprise on its two faces, along its peripheral zone, flanges 26 having very small sections, semi-circular in shape, projecting slightly over the faces of the plate allowing support of the seal 9 in order to ensure good tightness. Around each of the openings 18 for passage of a tie rod 8 for assembly of the module, the membrane-support plates 8 can comprise on their two faces circular beads 27 ensuring the support of a sealing device part and thus tightness around the tie rods passing through the whole module.

Figure 4:
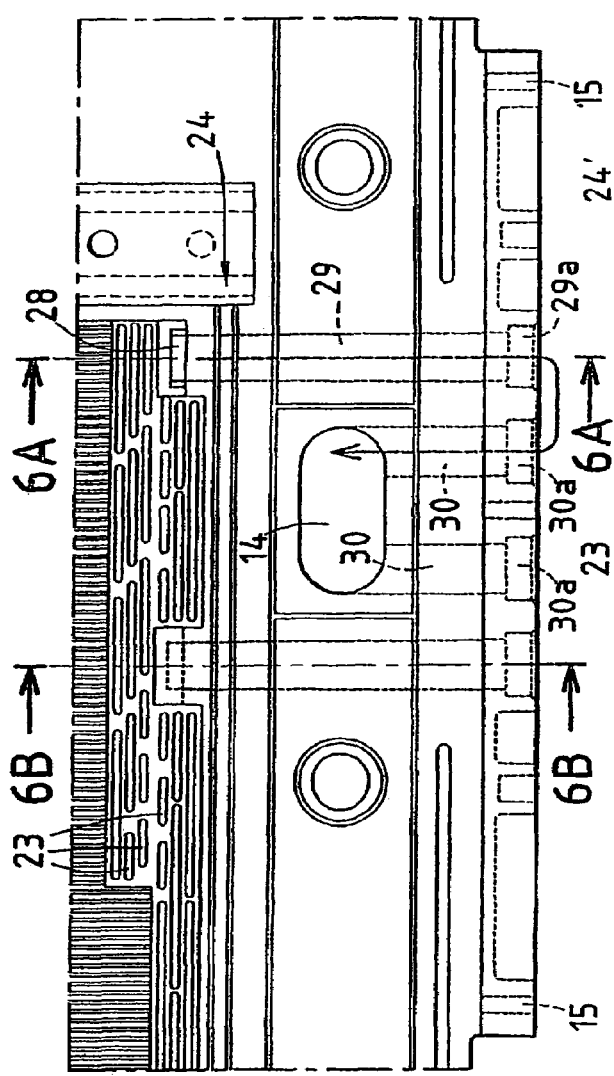
FIG. 4 is an enlarged view of detail 4 in FIG. 3.

As can be seen in FIGS. 4 and 6A, the membrane-support plate 8 comprises, in its permeate-recovery zone 24, a blind opening 28 opening onto face A of the membrane-support plate and connecting to a channel 29 in transversal direction passing through the edge of the membrane-support plate, in the thickness of the plate, which ends in an oblong-shaped connecting opening 29a, in the connecting strip 15 arranged projecting slightly relative to the lateral edge of the plate.

Figure 5:
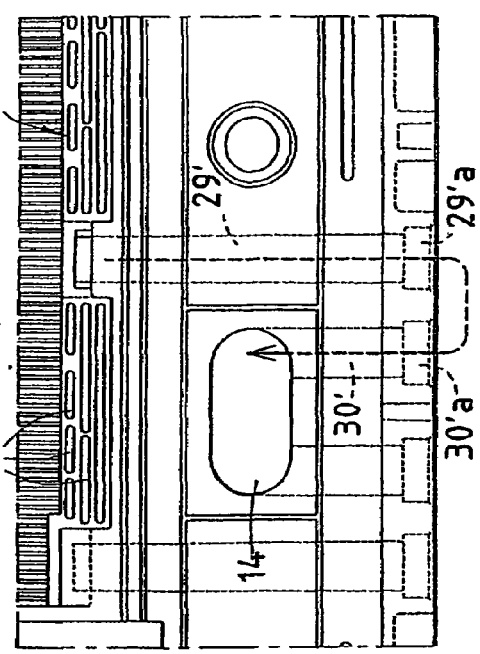
FIG. 5 is an enlarged view of detail 5 in FIG. 3.

Similarly, as can be seen in FIGS. 5 and 6B, the membrane-support plate 8 comprises, in its zone 24', a blind opening 28' opening onto face B and connecting to a permeate-recovery channel 29' opening onto the lateral side of the connecting strip 15 following an oblong-shaped opening 29'a.

As will be explained hereafter, the cassette 16 fixed on the lateral edge of the membrane-support plate 8 following the connecting strip 15 (see FIG. 9) comprises a first connecting conduit making it possible to connect the inlet channel 29 to an outlet channel 30 opening into the hole 14 passing through the membrane-support plate, i.e. into the longitudinal permeate-evacuation channel. Similarly, a second conduit connecting to the inside of the cassette 16 makes it possible to link the inlet channel 29' connecting to the opening 28' on face B of the membrane-support plate to an outlet channel 30' opening into the oblong opening 14 passing through the membrane-support plate 8, i.e. into the longitudinal permeate-evacuation channel.

FIGS. 6A to 6B in particular show that the zones 24 and 24' comprising baffles are not identical on faces A and B of the membrane-support plate. However, their functions are the same, the ribs 23 defining these baffles ensuring both the guiding of the permeate and the holding of the membrane 10 in its lateral part covered by the seal 9.

As can be seen in FIG. 3 and FIG. 7, the membranes 10 are fixed on each of the faces of the membrane-support plate 8 by means of the strips 20a and 20b introduced into the openings 19 and 19' ensuring, by wedge effect, the fixing of the longitudinal end edge of the membrane between an inclined surface of the edge of a strip and an inclined surface of the edge of the corresponding opening 19 or 19'.

The pins 31 on the male strips 20a are engaged in corresponding openings in the female strips, the male and female strips being arranged on either side of the membrane-support plate. After fixing a membrane at its longitudinal ends by the male and female strips engaged one in the other, ultrasonic welding of the pins 31 on the male strips engaged in the tapered-shaped openings of the female strips is carried out. Thus the male and female strips are locked one against the other and the membrane is effectively clamped at its longitudinal ends.

The strips 20a, 20b are produced such that their external plane surface is situated slightly offset towards the outside relative to the external surface of the corresponding membrane 10.

The longitudinal edges of the membrane come to rest on straight longitudinal beads 32 having a small semi-circular-shaped section, as can be seen for example in FIGS. 6A and 6B.

The fixing of the membrane along its longitudinal edges against the face of the membrane-support plate is ensured by clamping a seal 9 against the peripheral edges of the membrane-support plate and in particular against the straight longitudinal beads 32.

The membranes could also, as a variant, be fixed by gluing onto the membrane-support plates.

Figure 10:
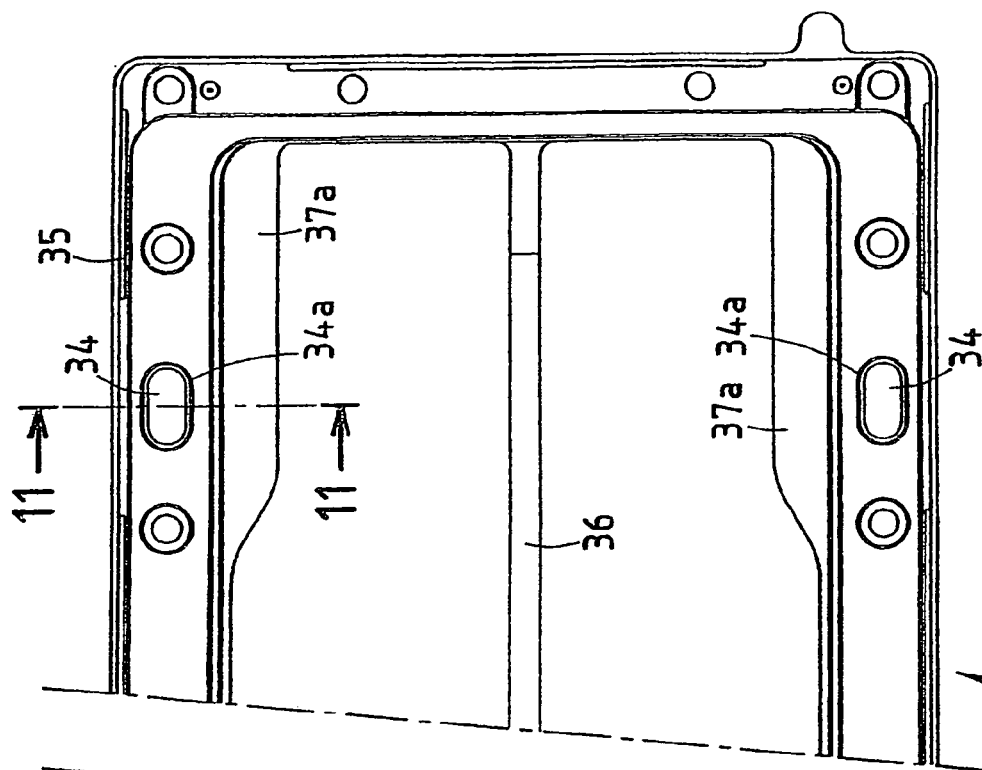
FIG. 10 is a plan view of a sealing device between membrane-support plates.

FIG. 10 shows a sealing device 9 intended to be inserted between two membrane-support plates or between a membrane-support plate and a separating plate or retaining plate.

The rubber sealing device 9, usually flat in shape, has the general shape of a rectangular frame analogous to the peripheral part of a membrane-support plate.

The sealing device 9 is passed through along its periphery by holes 33 for passing through tie rods, for assembly the module, each surrounded by a semi-circular bead 33a projecting from the face of the seal intended to engage around a corresponding bead projecting from a face of the membrane-support plate around an opening for passing a tie rod through.

The seal also comprises, on its two faces intended to come into contact with the faces of two membrane-support plates, on either side of the seal, peripheral beads 33b intended to complete the tightness between the seal and the plates, during the clamping of the module by the tie rods.

Figure 11:
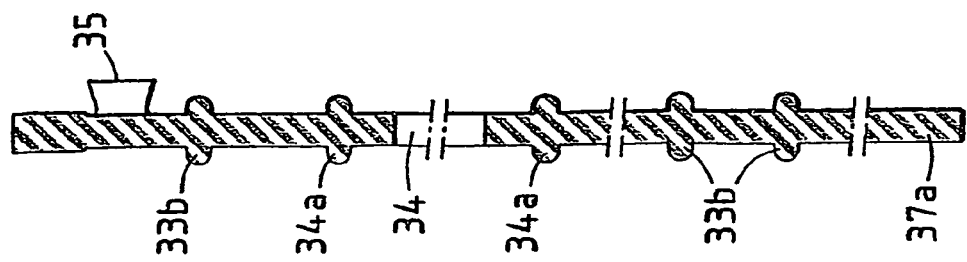
FIG. 11 is a cross-section along 11-11 in FIG. 10.

As can be seen in FIGS. 10 and 11, the seal comprises oblong-shaped openings 34 intended to coincide with the openings 14 passing through the membrane-support plates and the separating plates, during the assembly of the module, in order to constitute a straight continuous channel for evacuation of the permeate.

The oblong openings 34 are surrounded by tightness beads 34a with small dimensions and with a semi-circular section, intended to be supported on the membrane-support plates on either side of the seal, so as to ensure the tightness of the permeate-evacuation channel.

Finally the seal comprises, as can be seen in particular in FIG. 11, on a face intended to be supported on a membrane-support plate, projecting peripheral discontinuous ribs 35 having a plane support surface and intended to maintain a gap with a perfectly determined width between two successive membrane-support plates (or between a membrane-support plate and a separating plate). When the membrane-support plates equipped with membranes are assembled in adjacent positions and clamped together by the tie rods, the projecting ribs 35 acting as spacers ensure a perfectly continuous and perfectly determined gap between any two adjacent plates of the module. This gap makes it possible to adjust to a perfectly determined value the distance between two membranes situated opposite each other, i.e. the thickness of the fluid- and retentate-reception and circulation space between two membranes 10.

The projecting parts 35 acting as spacers are arranged along the four sides of the seal but are not however continuous along the periphery of the seal.

In the case of an assembly without a sealing device, a plastic insert can ensure the adjustment of the gap between the membranes.

The seal moreover comprises, in its internal part, one or two continuous peripheral 33b beads intended to be supported on the membrane and, along a median line of the seal opening, a central tongue 36 in a longitudinal direction intended to be supported on the membranes, on the two faces of the seal, by means of a support zone in which the tongue 36 has an increased thickness, along the greater part of the length of the membrane. Thus vibrations of the membranes are avoided when the latter are in contact with the fluid or retentates circulating in the longitudinal direction of the membranes and of the membrane-support plates, in the circulation spaces 13 between the membranes. There is a risk that vibration of the membranes will lead to damage and accelerated wear of these membranes.

The sealing device 9 comprises, along its internal longitudinal edges, a plane part 37 comprising at one of the ends of the seal 9 enlarged parts 37a intended to be supported, during the clamping of the seal, on the edges of the membrane beyond the support beads 33b. The enlarged zones 37a are arranged at the upper end of the seal intended to face the permeate-recovery zone.

The sealing device 9 can be entirely flat, projecting ribs being able to be provided on the faces of the membrane-support plates coming into contact with the sealing device, in order to adjust the gap between the membrane-support plates and ensure support on the sealing device.

FIG. 7 shows the membranes 10 in their clamping position, their longitudinal ends being held between the strips 20a and 20b and the corresponding edges of the openings 19 and 19' of the membrane-support plate and their longitudinal ends held by clamping of a sealing device. In this case, the membrane 10, with a small thickness is flexible and deformed in order to have undulations which are successive in the longitudinal direction, in a transversal direction corresponding to the grooves 22 between the ribs 21.

These successive undulations of the membranes in the longitudinal direction of the membrane-support plates, on either side of a fluid- and retentate-reception and circulation space 13 makes it possible to create a turbulent circulation of the fluid and retentate which is favourable for avoiding the clogging of the membranes and in order to promote the ultra-filtration effect on contact with the membranes.

Moreover, the external surface of the strips 20a and 20b onto which the fluid introduced through the openings 11 flows out, which is slightly offset towards the outside relative to the external surface of the membrane produces a springboard effect for the fluid before it comes into contact with the membrane. Thus, there is no risk of the tangential outflow of the fluid striking against the end part of the membrane on entering the circulation space 13.

Figure 9:
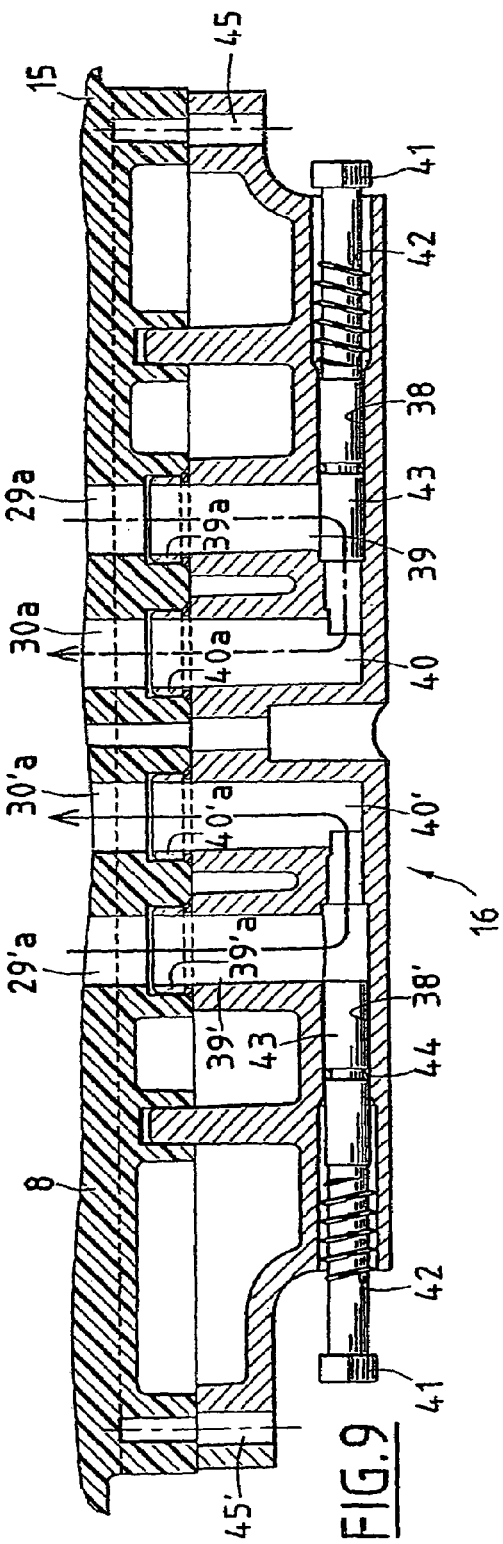
FIG. 9 is a plan view of a cassette for visualization of the permeate mounted on the lateral edge of a membrane-support plate.

FIG. 9 shows a cassette 16 engaged and fixed on a connecting strip 15 on the edge of a membrane-support plate 8.

The cassette 16 is preferably produced in a single piece by moulding of a plastic such as PET (polyethylene terephthalate). Such a material is perfectly rigid and transparent and resists most of the fluids constituting a separable permeate of an industrial fluid.

The cassette 16 as represented in FIG. 9 makes it possible to carry out the visualization of the circulation of the permeate between the outlet of a first permeate recovery space arranged along a first face of the membrane-support plate and the longitudinal evacuation channel and the outlet of a second permeate recovery space arranged on the second face of the membrane-support plate on which the cassette 16 and the longitudinal evacuation channel are fixed. The cassette 16 also makes it possible to isolate, independently of each other, the first and the second permeate-recovery spaces, from the longitudinal evacuation channel for permeate passing through the edge of the membrane-support plate on which the cassette 16 is fixed.

The two parts of the cassette 16 ensuring the visualization and the stopping of the circulation of permeate from the first and second permeate-recovery spaces are arranged one after the other in the longitudinal direction of the membrane-support plate. The cassette 16 has a totally symmetrical structure relative to a plane in the transversal direction perpendicular to the membrane-support plate. Therefore only one of the two parts of the cassette 16 will be described in detail, the second part being similar and performing functions identical to the first part, on the permeate originating from a second recovery space.

It would of course be possible to perform visualization and isolation functions on the two recovery spaces on either side of the membrane-support plate using two cassettes having separate bodies. However, the production of double cassettes as shown in FIG. 9 has advantages with regard to the production and mounting of the cassettes.

The cassette 16 is produced in the form of a body having internal recesses together constituting a connecting conduit between two parts of the permeate-evacuation channels associated with a recovery space 25.

The semi-cassette 16 intended to ensure the connection between the outlet of the recovery space situated on face A of the adapter plate 8 (see FIG. 4) and the hole 14 in the longitudinal permeate-evacuation channel comprises a conduit 39 terminating in a fitting 39*a* and a conduit 40 terminating in a fitting 40*a* parallel to each other and in a transversal direction relative to the membrane-support plate intended to be connected to the respective channels 29 and 30 in the membrane-support plate 8, by means of the oblong-shaped fittings 39*a* and 40*a* engaged in the receiving openings 29*a* and 30*a* of the connecting strip 15 of the membrane-support plate with insertion of a ring-shaped sealing device avoiding any permeate leakage.

The semi-cassette associated with the recovery space of face A of the membrane-support plate comprises a conduit 38 joining the conduits 39 and 40 in longitudinal direction, i.e. parallel to the edge of the membrane-support plate and to the connecting strip 15.

The conduit 38 is extended in order to open outside the cassette 16, at one longitudinal end of the cassette, by an opening with a diameter greater than the diameter of the channel joining the conduits 39 and 40.

A stainless steel screw 17 successively comprising a profiled screw head 41, a threaded part 42 and a plugging piston 43 can be engaged in the opening 38, either in a closed position or in an open position of connection between the conduits 39 and 40.

FIG. 9 shows a screw 17 in an open position of the conduit 38 connecting conduit 39 to conduit 40 and a screw 17 in an open position ensuring a free passage between the conduits 39' and 40'.

The thread 42 of the stainless steel screw 17 is self-tapping and has an external diameter slightly greater than the internal diameter of the opening part extending the conduit 38.

In the open position represented on the semi-cassette controlling the circulation of permeate originating from the recovery space on face A of the membrane-support plate, the end of the plugging piston 43 is situated upstream of the conduit 39 opening into the conduit 38, so that the conduits 39 and 40 are connected in order to ensure the circulation of permeate.

In its closed position, the end of the plugging piston 43 of the screw 17 comes to rest on a shoulder of the channel 38', downstream of the opening of the conduit 39' opening into the conduit 38'. In this position, the plugging piston 43 interrupts the connection between the conduits 39' and 40'.

The plugging piston 43 comprises a groove in which a rubber ring-shaped sealing device 44 is arranged, avoiding any permeate escaping via the opening extending the connecting channel 38.

The mounting of the cassette 16 on the edge of the membrane-support plate 8 is carried out by engaging the fittings 39*a*, 40*a*, 39'*a* and 40'*a* in the corresponding openings 29*a*, 30*a*, 29'*a*, 30'*a* in the connecting strip 15 and by fixing the cassette by screws engaged in openings passing through the cassette such as the openings 45 and in corresponding openings in the strip integral with the lateral edge of the membrane-support plate.

The channels 29 and 30 of the membrane-support plate are then connected, respectively, to the channels 39 and 40 of the cassette 16, and in the same way, the channels 29' and 30' of the membrane-support plate are connected to the connecting conduits 39' and 40' of the cassette 16.

During normal operation of the filtration device at the level of the permeate-recovery spaces on either side of the membrane-support plate, the permeate circulates in the direction indicated by the arrows in FIGS. 4, 5 and 9 and passes from the permeate-recovery zones such as 24 and 24' to the longitudinal permeate-evacuation channel, via the channels 29, 30, 29', 30' in the membrane-support plate and corresponding connecting conduits in the cassette 16, as indicated by the curved arrows in FIGS. 4, 5 and 9.

The circulation of the permeate inside the cassette 16 is perfectly visible to an operator responsible for the supervision of the installation.

In case of turbidity or colouration of the circulation of the permeate in one of the semi-cassettes resulting from a leak through the membrane of the corresponding recovery space, the operator ensures the isolation of the recovery space by screwing the screw 41 so as to move the plugging piston 43 from its open position represented on the right of FIG. 9 to its closed position represented on the left of FIG. 9. The permeate circulation is then interrupted inside the cassette and the recovery space, the membrane of which has a leak, is totally isolated from the permeate-evacuation channel. Moreover, each cassette (or semi-cassette) being associated with a particular recovery space, the operator knows which membrane has a leak. After stopping the installation, the defective membrane can therefore be replaced.

The module shown in FIGS. 1 and 2 comprises three sub-assemblies 2*a*, 2*b* and 2*c*, the successive sub-assemblies 2*a* and 2*b* and 2*b* and 2*c* being separated from each other by separating plates 4*a* and 4*b*, so that the successive sub-assemblies 2*a*, 2*b* and 2*c* each constituted by fourteen adjacent membrane-support plates are arranged in series.

Figure 12:
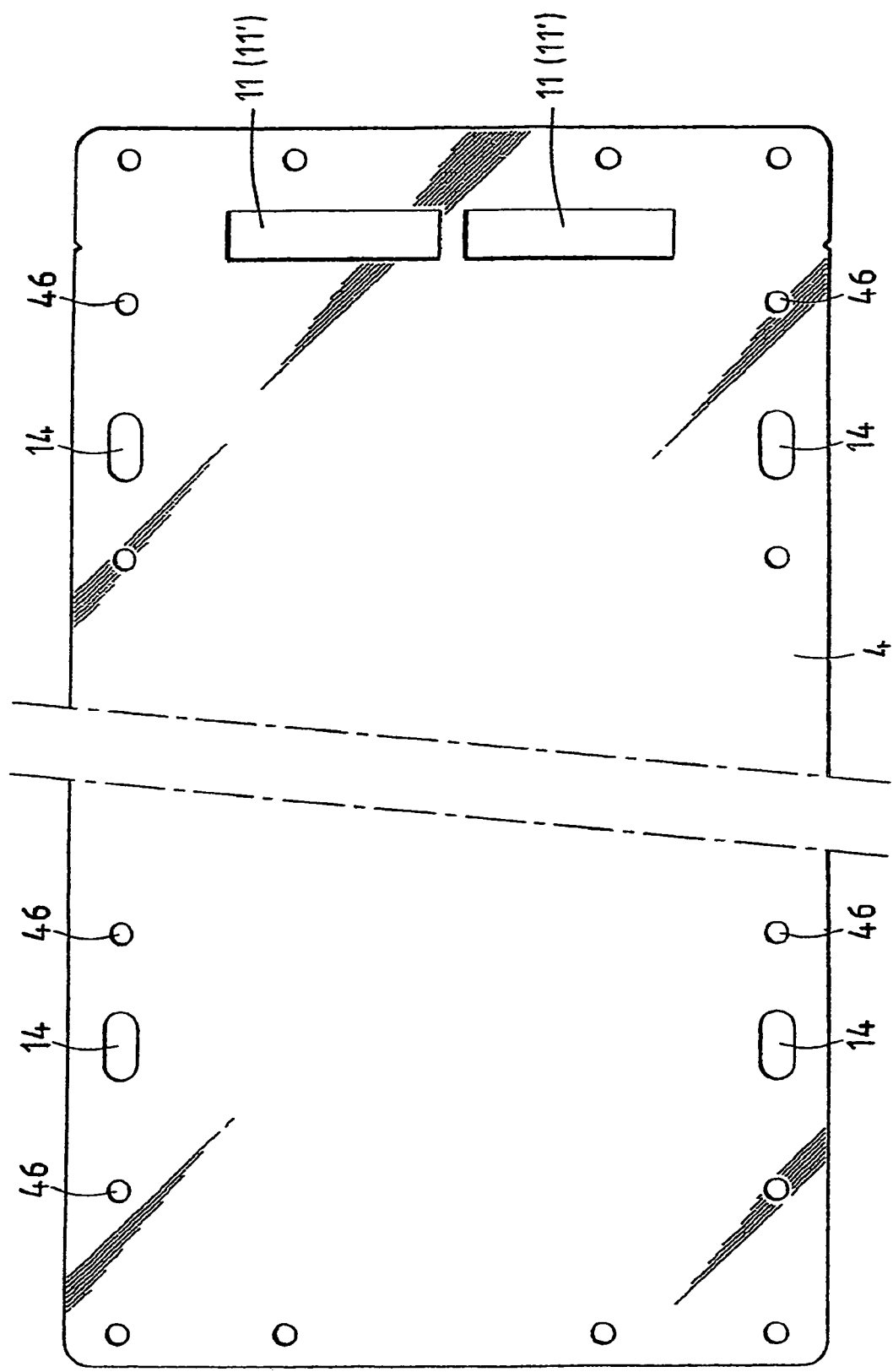
FIG. 12 is a plan view of a separating plate of the module according to the invention.

FIG. 12 shows a separating plate 4 which is a plane metallic plate, for example made of austenitic stainless steel (304 L or 316 L) through which there are openings 46 in its peripheral part for the passage of the tie rods for assembly and clamping of the elements of the ultrafiltration module.

The separating plate 4 has a shape and dimensions identical to those of a membrane-support plate but can be arranged in one of two inversed positions to each other relative to the membrane-support plates. The side comprising the openings 11 (or 11') in the separator plate 4 can be arranged towards the bottom or towards the top during assembly of the module, depending on the function sought for the separating plate in the assembly in series of the sub-assemblies of the module.

The separating plate 4 is passed through by four openings 14 analogous in their shape and dimensions to the openings 14 of the adapter plate arranged following two assemblies which are symmetrical relative to a median line in transversal direction of the separating plate, in arrangements analogous to the openings 14 in the membrane-support plates.

As can be seen in FIG. 2, the separating plate 4a is arranged with its rectangular-shaped openings in the upper part in alignment with the openings 11' for the passage of retentate from the membrane-support plates 8 of the first sub-assembly 2a.

The second separating plate 4b is arranged in an inversed position to the plate 4a, the rectangular-shaped openings in the separating plate 4b being arranged in the lower part, in the extension of the openings 11' in the membrane-support plates of the second sub-assembly 2b ensuring the passage of the retentate.

The separating plates can, as a variant, be made of plastic, for example polyvinyl chloride (PVC).

At the outlet of the sub-assembly 2a, the retentate passing through the openings 11 in the upper part of the separating plate 4a penetrates into the aligned openings 11 in the upper part of the membrane-support plates of the second sub-assembly 2b in order to be distributed into the fluid-reception and circulation spaces of the second sub-assembly 2b. The retentate leaving the first sub-assembly 2a therefore constitutes the fluid to be filtered by the second sub-assembly 2b which is placed in series relative to the first sub-assembly 2a.

The retentate obtained at the outlet from the fluid-reception and circulation spaces arrives in the openings 11' in the lower part of the membrane-support plates of the second sub-assembly, in order to be transported towards the outlet of the second sub-assembly.

The second sub-assembly therefore operates in the inversed direction relative to the first sub-assembly, as regards the circulation of the fluid to be filtered and the retentate.

At the outlet from the second sub-assembly 2b, the retentate passes through the openings 11' in the plate 4b, in an inversed position relative to the separator plate 4a, in order to penetrate into the openings 11 in the membrane-support plates of the third sub-assembly 2c which constitute by their juxtaposition a fluid-distribution channel in the successive reception and circulation spaces of the third sub-assembly 2c.

The retentate obtained at the outlet of module 2c is recovered inside the holes 11' in the upper part of the sub-assembly 2c then evacuated via an opening and a module outlet fitting 5b connected to a retentate-recovery pipe, i.e. a paint recovery pipe on which a pump is placed making it possible to recycle the paint into the cataphoresis painting container.

The third sub-assembly 2c therefore operates in the same direction as the first sub-assembly 2a.

The openings 11 in the membrane-support plates of the third sub-assembly 2c arranged in the lower part of the membrane-support plates constitute by their juxtaposition a distribution channel of the retentate originating from the second sub-assembly 2b which is closed at its outlet end, by the retaining plate 3b the lower openings of which are closed by plugs, as is explained hereafter.

Whatever the sub-assembly, the permeate recovery is carried out in the upper part of the sub-assembly by a single longitudinal recovery channel on each of the sides of the module assembly, the separating plates 4a and 4b comprising openings 14 capable of ensuring the passage between two successive sub-assemblies, in the vicinity of their two ends.

Whatever the position of the separating plate, the connection between the successive parts of the longitudinal recovery channels of the sub-assemblies situated in the high part of the module is ensured. The cassettes 16 allowing the supervision of the installation are thus always situated in the upper part of the ultrafiltration module. The permeate which is recovered at the level of the first retaining plate 3a by the fittings 6a circulates in the longitudinal direction in a direction inversed relative to the general direction of circulation of the fluid through the module.

FIG. 13 shows a retaining plate 3 which is of standard shape, the plate 3a or the plate 3b at the ends of the module represented in FIG. 2 being identical but placed in inversed arrangements relative to each other, with respect to their high and low part.

The retaining plate 3 which can be made of aluminium alloy or plastic or composite has a structure making it possible to ensure very great rigidity of the plate which must support the clamping forces of the assembly of tie rods 8. The plate which is made in moulded form comprises a plane part reinforced by longitudinal ribs 47 and by transversal ribs 48 perpendicular to the longitudinal ribs intersecting at right angles at the level of reinforced joining parts which can constitute, at the periphery of the retaining plate 3, eyelets 7 for engaging and clamping the tie rods 8.

The internal plane face of the retaining plate intended to come into contact with a sealing device 9 or a plastic insert is preferably coated with Rilsan.

Along its longitudinal edges, the retaining plate 3 comprises four projecting parts 49 intended to ensure, two by two along the direction of mounting of the retaining plate 3, protection of the assemblies of cassettes 16 projecting relative to the lateral edges of the membrane-support plates in their upper part.

The arrangement of the projecting parts 49 along the two longitudinal edges of the retaining plate 3 and in symmetrical arrangements relative to a median transversal plane of the plate makes it possible to use identical retaining plates in a first position (that of the plate 3a) and in an inversed second position (that of the plate 3b in FIG. 2).

Similarly, feet 50 are provided at the two ends of the retaining plate 3 to serve as support for the module whatever the position of the retaining plate.

Generally, the retaining plate is totally symmetrical relative to a longitudinal median plane and relative to a transversal median plan, apart from the production of the openings 5 and 6 ensuring the connection of the module, either to an inlet of fluid to be filtered, or to permeate-recovery pipes, or to retentate-recovery pipes.

The arrangement of the plates in one of their two positions and the use of plugs makes it possible to easily adapt the module to different configurations of industrial installations.

When the module is assembled and connected by one of the fittings of a first retaining plate to a pipe for supplying fluid under pressure, the fluid is distributed into the successive fluid-reception and circulation spaces 13 of a first sub-assembly (or of a single sub-assembly of the installation) and circulates in the longitudinal direction of the membrane-support plates and the membranes in such a manner that the fluid sweeps the external surface of the opposing membranes delimiting the circulation spaces and that a permeate is separated from the fluid, in such a manner that the fluid separated from the first fraction constituted by the permeate constitutes the retentate. The fluid to be filtered and the retentate circulate at high speed in contact with the membranes, which ensures self-cleaning of the membranes and therefore limits clogging during the use of the device.

The retentate can be removed and used at the outlet of a first sub-assembly or, on the other hand, be sent as fluid to be filtered into a second sub-assembly. A third sub-assembly can be placed in series following the second assembly for receiving the second retentate, at the outlet of the second sub-assembly. The retentate recovered at the outlet of the installation which contains paint pigments and binders, in the case of the treatment of a paint, can be reused and for example returned to the paint container of a cataphoresis painting installation.

The permeate is recovered equally well at the level of each of the sub-assemblies in a common evacuation channel. In the case of the separation treatment of the constituents of a paint for vehicle bodies, the permeate containing the paint solvent which is largely constituted by demineralized water can be reused for rinsing the bodies leaving the paint baths, for example cataphoresis paint baths.

Modules comprising any number of successive sub-assemblies placed in series can be used, depending on the filtration requirements and the performance of the membranes.

In all cases, the filtration modules according to the invention make it possible to constantly supervise the operation and integrity of all the membranes used, to determine the location of a membrane having a leak and to isolate a permeate-recovery space comprising a defective membrane, until this membrane is replaced, which avoids polluting, even slightly, the permeate recovered in the installation.

In the case of the module represented in FIG. 2, the permeate is recovered on the inlet face of the module by the fittings 6a and 6b to which pipes can be connected. A pump situated upstream of the module makes it possible to circulate the paint in the module. A pressure induced in the module makes it possible to maintain a perfectly adjusted pressure difference through the ultrafiltration membranes during the separation treatment.

This trans-membrane pressure makes it possible to ensure the passage of the permeate through the membranes and the circulation of the permeate at a substantially constant flow rate up to the means of reusing the permeate (for example nozzles for rinsing car bodies).

The invention is not strictly limited to the embodiments which have been described.

It is thus that the invention can be implemented in the case of filtration processes using membranes of various types for example microfiltration membranes comprising pores with micrometric dimensions instead of ultrafiltration membranes comprising pores with nanometric dimensions.

The invention can be used outside the preferential application described involving the separation of solvent and paint originating from paint containers or cleaning tanks of a cataphoresis painting installation.

The invention can be used for the filtration of liquids of widely varying natures or even for the filtration of any fluids, for example gases.

What is claimed is:

1. A device for the separation of a fluid into a first fraction and at least one second fraction by bringing the fluid into contact with a plurality of filtration membranes, said device comprising at least one sub-assembly of membrane-support plates on each of the opposite faces of which is fixed a filtration membrane, mounted on a part of the membrane-support plate said device comprising means for guiding fluid for the drainage, inside of a recovery space delimited between the membrane and the membrane-support plate, of the first fraction of the fluid passing through the membrane towards a set of evacuation channels of the first fraction of the fluid into a part adjacent to a lateral edge of the membrane-support plate and for obtaining turbulence on the outflow of the fluid, the membrane-support plates of the assembly being mounted against one another in a watertight manner, at their peripheral part, two adjacent membrane-support plates delimiting a space for the reception and circulation of the fluid between two membranes fixed on opposing faces of two adjacent membrane-support plates, means for supplying the reception and circulation spaces of the sub-assembly with fluid, means for recovery of the first fraction of fluid in communication with assemblies of channels for evacuation of the first fraction of fluid and means for evacuation of the fluid separated from the first fraction constituting the second fraction of the fluid, wherein the assemblies of evacuation channels of the first fraction of the fluid comprise, for each of the membrane-support plates of the sub-assembly and for each of the recovery spaces, a portion provided inside a rigid part adjacent to the lateral edge of the membrane-support plate containing a plugging means which can be actuated in order to stop the circulation of the first fluid in the corresponding recovery space.

2. The device according to claim 1, wherein the rigid part adjacent to the lateral edge of the membrane-support plate is a piece made from transparent plastic material mounted projecting laterally relative to the lateral edge of the membrane-support plate so as to render visible a circulation of the first fraction of the fluid in the portion of the evacuation channels provided inside the piece projecting laterally relative to the lateral edge of the membrane-support plate.

3. The device according to claim 2, wherein the rigid piece projecting radially relative to a lateral edge of the membrane-support plate is made of polyethylene terephthalate.

4. The device according to claim 2, wherein the rigid piece projecting laterally relative to the lateral edge of the membrane-support plate is a cassette comprising a body in a single piece in which there are provided first conduits connecting a channel of a first assembly of evacuation channels of the first fraction of the fluid with first means of recovery of the first fraction of the fluid in a first recovery space between a first face of the membrane-support plate and a first membrane and second conduits connecting a channel of a second assembly of channels of evacuation of the first fluid with second means of recovery of the first fluid in a second recovery space of the first fluid between the second face of the membrane-support plate and a second membrane fixed on the second face of the membrane-support plate, the first connecting conduits and the second connecting conduits of the cassette being arranged in successive parts of the cassette in a longitudinal direction along the lateral edge of the membrane-support plate directed following the direction of circulation of the fluid in contact with the membranes carried by the membrane-support plate.

5. The device according to claim 2, wherein the rigid pieces projecting laterally relative to a lateral edge of two adjacent membrane-support plates are fixed following parallel lateral edges of the adjacent membrane-support plates situated on both sides of the sub-assembly of the device in a transversal direction perpendicular to the longitudinal direction of circulation of the fluid in each of the circulation spaces and perpendicular to the longitudinal direction of the sub-assembly according to which the evacuation of the first and second fractions of the fluid is carried out.

6. The device according to claim 2, wherein the means for plugging the portion of the assembly of channels for evacuation of the first fluid provided inside the rigid piece projecting radially relative to a lateral edge of the membrane-support plate is a screw comprising a threaded part intended to be screwed into an opening in the rigid piece opening outside the rigid piece and connected to the portion of the assembly of evacuation channels provided in the rigid piece and a plugging piston mobile between an opening position and a closing position of the portion of the assembly of channels for evacuation of the first fluid provided inside the rigid piece.

7. The device according to claim 1, wherein the rigid part adjacent to the lateral edge of the membrane-support plate is an integral part of the membrane-support plate.

8. The device according to claim 1, wherein the assembly of channels for evacuation of the first fraction of fluid, the means for supplying the circulation spaces of the sub-assembly with fluid and the means for recovery of the second fraction of fluid are openings passing through the juxtaposed membrane-support plates, during the assembly of the membrane-support plates in adjacent position.

9. The device according to claim 1, wherein the means for recovery of the first fraction of the fluid in a recovery space delimited between a membrane and a face of the membrane-support plate comprise ribs which are substantially straight in a longitudinal direction and discontinuous, aligned in the vicinity of a lateral edge in a longitudinal direction of the membrane-support plate delimiting between them baffles for the passage of the first fluid and for guiding the first fluid towards the assembly of evacuation channels of the first fraction of the fluid, the straight and discontinuous parts projecting on the face of the membrane-support plate also ensuring maintenance of the membrane delimiting the recovery space with the face of the membrane-support plate.

10. The device according to claim 1, wherein the spacing between the membrane-support plates and the thickness of the zones for receiving and circulation of fluid between two opposing membranes carried by two adjacent membrane-support plates is controlled by one of the following means:
   a sealing device inserted between two successive membrane-support plates comprising, at its periphery intended to come into contact with a peripheral part of a membrane-support plate, at least one part projecting relative to a surface of the sealing device parallel to a membrane-support plate, so that the thickness of the sealing device is a maximum following the projecting part,
   plastic insert between the peripheral parts of two adjacent membrane-support plates,
   rib projecting over a peripheral part of a membrane-support plate.

11. The device according to claim 10, wherein the sealing device intended to be inserted between two membrane-support plates which has the general shape of a rectangular frame comprises a central sealing part arranged substantially following a median line in a longitudinal direction of the sealing device in the shape of a rectangular frame, so as to limit or prevent the vibrations of the membranes carried by the membrane-support plates between which the sealing device is inserted.

12. The device according to claim 1, comprising at least one sub-assembly of membrane-support plates of a substantially rectangular shape arranged so that longitudinal direction of the membrane-support plates is vertical, wherein the rigid parts adjacent to a longitudinal lateral edge of the membrane-support plate are situated in a upper part of longitudinal lateral edges of the membrane-support plates.

13. The device according to claim 1, comprising at least two sub-assemblies of membrane-support plates separated from each other by separating plates and held assembled between two end retaining plates, the separating plates being passed through by at least one opening for the passage of the fluid or the second fraction of the fluid at one longitudinal end, and by two sets of two lateral openings for passage of the second fraction of the fluid into longitudinal end parts and into lateral zones of the separating plates, so as to be able to carry out an assembly in series of the sub-assemblies.

14. The device according to claim 13, wherein the end retaining plates at each of the ends of the device constituted by at least two sub-assemblies comprise parts projecting laterally for protection of the rigid parts adjacent to lateral edges of the membrane-support plates placed in a juxtaposed manner during the assembly of the membrane-support plates and of the sub-assemblies of the separation device.

15. The device according to claim 1, wherein the membranes are filter membranes comprising pores of nanometric or micrometric dimensions, the first fraction of the fluid being a permeate obtained by ultrafiltration or microfiltration and the second fraction of the fluid being a retentate.

16. A method for the separation of solvent and paint implemented in an industrial cataphoresis painting installations, comprising subjecting a mixture of said solvent and paint to a device according to claim 1.

17. A device for the separation of a fluid into a first fraction and at least one second fraction by bringing the fluid into contact with a plurality of filtration membranes, comprising at least one sub-assembly of membrane-support plates on each of the opposite faces of which is fixed a filtration membrane, mounted on a part of the membrane-support plate comprising means for guiding fluid for drainage, inside of a recovery space delimited between the membrane and the membrane-support plate, of the first fraction of the fluid passing through the membrane towards a set of evacuation channels of the first fraction of the fluid into a part adjacent to a lateral edge of the membrane-support plate and for obtaining turbulence on outflow of the fluid, the membrane-support plates of the assembly being mounted against one another in a watertight manner, at their peripheral part, two adjacent membrane-support plates delimiting a space for the reception and circulation of the fluid between two membranes fixed on opposing faces of two adjacent membrane-support plates, means for supplying reception and circulation spaces of the sub-assembly with fluid, means for recovery of the first fraction of fluid in communication with assemblies of channels for evacuation of first fraction of fluid and means for evacuation of the fluid separated from the first fraction constituting the second fraction of the fluid, wherein the assemblies of evacuation channels of the first fraction of the fluid comprise, for each of the membrane-support plates of the sub-assembly and for each of the recovery spaces, a portion provided inside a rigid part adjacent to the lateral edge of the membrane-support plate having plugging means which can be actuated in order to stop the circulation of the first fluid in the corresponding recovery space,
   the rigid part adjacent to the lateral edge of the membrane-support plate is a piece made from transparent plastic material mounted projecting laterally relative to the lateral edge of the membrane-support plate so as to render visible a circulation of the first fraction of the fluid in the portion of the evacuation channels provided inside the piece projecting laterally relative to the lateral edge of the membrane-support plate.

18. The device according to claim 17, wherein the rigid piece projecting laterally relative to the lateral edge of the membrane-support plate is a cassette comprising a body in a single piece in which there are provided first conduits connecting a channel of a first assembly of evacuation channels of the first fraction of the fluid with first means of recovery of the first fraction of the fluid in a first recovery space between a first face of the membrane-support plate and a first membrane and second conduits connecting a channel of a second assembly of channels of evacuation of the first fluid with second means of recovery of the first fluid in a second recovery space of the first fluid between the second face of the membrane-support plate and a second membrane fixed on the second face of the membrane-support plate, the first connecting conduits and the second connecting conduits of the cassette being arranged in successive parts of the cassette in a longitudinal direction along the lateral edge of the membrane-support plate directed following the direction of circulation of the fluid in contact with the membranes carried by the membrane-support plate.

19. A device for the separation of a fluid into a first fraction and at least one second fraction by bringing the fluid into contact with a plurality of filtration membranes, comprising at least one sub-assembly of membrane-support plates on each of opposite faces of which is fixed a filtration membrane, mounted on a part of the membrane-support plate comprising means for guiding fluid for the drainage, inside of a recovery space delimited between the membrane and the membrane-support plate, of the first fraction of the fluid passing through the membrane towards a set of evacuation channels of the first fraction of the fluid into a part adjacent to a lateral edge of the membrane-support plate and for obtaining turbulence on outflow of the fluid, the membrane-support plates of the assembly being mounted against one another in a watertight manner, at their peripheral part, two adjacent membrane-support plates delimiting a space for the reception and circulation of the fluid between two membranes fixed on opposing faces of two adjacent membrane-support plates, means for supplying the reception and circulation spaces of the sub-assembly with fluid, means for recovery of the first fraction of fluid in communication with assemblies of channels for evacuation of the first fraction of fluid and means for evacuation of the fluid separated from the first fraction constituting the second fraction of the fluid, wherein the assemblies of evacuation channels of the first fraction of the fluid comprise, for each of the membrane-support plates of the sub-assembly and for each of the recovery spaces, a portion provided inside a rigid part adjacent to the lateral edge of the membrane-support plate associated with plugging means which can be actuated in order to stop circulation of the first fluid in the corresponding recovery space, the device comprises at least two sub-assemblies of membrane-support plates separated from each other by separating plates and held assembled between two end retaining plates, the separating plates being passed through by at least one opening for the passage of the fluid or the second fraction of the fluid at one longitudinal end, and by two sets of two lateral openings for the passage of the second fraction of the fluid into longitudinal end parts and into lateral zones of the separating plates, so as to be able to carry out an assembly in series of the sub-assemblies.

* * * * *